United States Patent [19]
Wale

[11] 3,893,323
[45] July 8, 1975

[54] APPARATUS FOR FORMING CUTTING TOOL FACES

[75] Inventor: Dennis Harry Wale, Leicester, England

[73] Assignee: Marwin Cutting Tools Limited, Rothley, England

[22] Filed: Aug. 26, 1974

[21] Appl. No.: 500,283

Related U.S. Application Data

[63] Continuation of Ser. No. 397,844, Sept. 17, 1973, abandoned, which is a continuation of Ser. No. 235,434, March 16, 1972, abandoned, which is a continuation of Ser. No. 863,841, Oct. 6, 1969, abandoned.

[52] U.S. Cl. .................................. 72/128; 72/342
[51] Int. Cl. ............................................ B21d 11/06
[58] Field of Search ...................... 72/128, 342, 253

[56] References Cited
UNITED STATES PATENTS 2,062,552  12/1936  Burgess et al. ..................... 72/128
2,958,753  11/1960  Davis et al. ......................... 72/342

*Primary Examiner*—Lowell A. Larson
*Attorney, Agent, or Firm*—Ralph W. Kalish

[57] ABSTRACT

A method for producing a cutting face from a hard cutting material for engineer's tools comprising, essentially, presenting the metal stock to a feed slot within a forming core, heating the same to its deformation temperature and then forcing now deformed stock through said forming core into the desired shape. A helical cutting face produced by such method having a length greater than one-third its total lead; a helix angle in the range of 10–45°; being of a length of 1½ inches upward depending upon the particular tool requirement; and being of any desired cross-section.

6 Claims, 3 Drawing Figures

APPARATUS FOR FORMING CUTTING TOOL FACES

This application is a continuation of Ser. No. 397,844 filed Sept. 17, 1973, which was a continuation of Ser. No. 235,434 filed Mar. 16, 1972, which was a continuation of Ser. No. 863,841 filed Oct. 6, 1969, all now abandoned.

BACKGROUND AND SUMMARY OF THE INVENTION

Invention relates in general to cutting tools and, more particularly, to cutting faces therefor and methods for forming same.

Heretofore, the techniques for forming cutting faces for cutting tools, such as by molding, centering, and grinding metallic materials into desired shape, made it possible only to produce helical or spiral faces which were so short in length that a number of such faces had to be secured to the edge of each flute of the cutting tool. This was undesirable because a tool made in such manner marked the work piece. In order to mitigate such undesired marking it has been necessary to stagger the joints between the faces on the different flutes. By the present invention, a cutting face is formed which is of a length that only one such face need be secured to the edge of each flute.

Therefore, it is an object of the present invention to provide a method for producing a cutting face for cutting tools which is of helical form and of a length greater than one-third its total lead.

Another object of the present invention is to provide a method for producing a cutting face formed on a helix angle in the range of 10°–45° and with a length from 1½ inches upwards dependent upon the requirements of the particular tool.

A further object of the present invention is to provide a method for producing a helical cutting face formed from a length of metal stock preferably quadrangular in cross-section although circular or elliptical cross-sectional stock may be used; which comprises heating the stock to its deformation temperature while within the feed slot of a forming core, then forming same into the desired shape and then allowing same to cool.

A still further object of the present invention is to provide a method of producing a helical or spiral cutting face of relatively high angle.

Another object of the present invention is to provide a helical cutting face which may be readily secured to the edge of each flute of existing cutting tools as by brazing.

A further object of the present invention is to provide a method for producing a helical cutting face which may be economically performed and which is reliable for the production of consistently high grade cutting faces of the intended properties.

It is another object of the present invention to provide a cutting face for engineer's tools which is produced from hard cutting material being helical or spiral in form, having a length greater than one-third its total lead and with its helix angle being in the range of 10°–45° and upwards.

It is another object of the present invention to provide apparatus for utilization in practicing a method for producing cutting faces of helical or spiral form having the characteristics above recited.

DESCRIPTION OF THE PREFERRED EMBODIMENT

Figure 1:
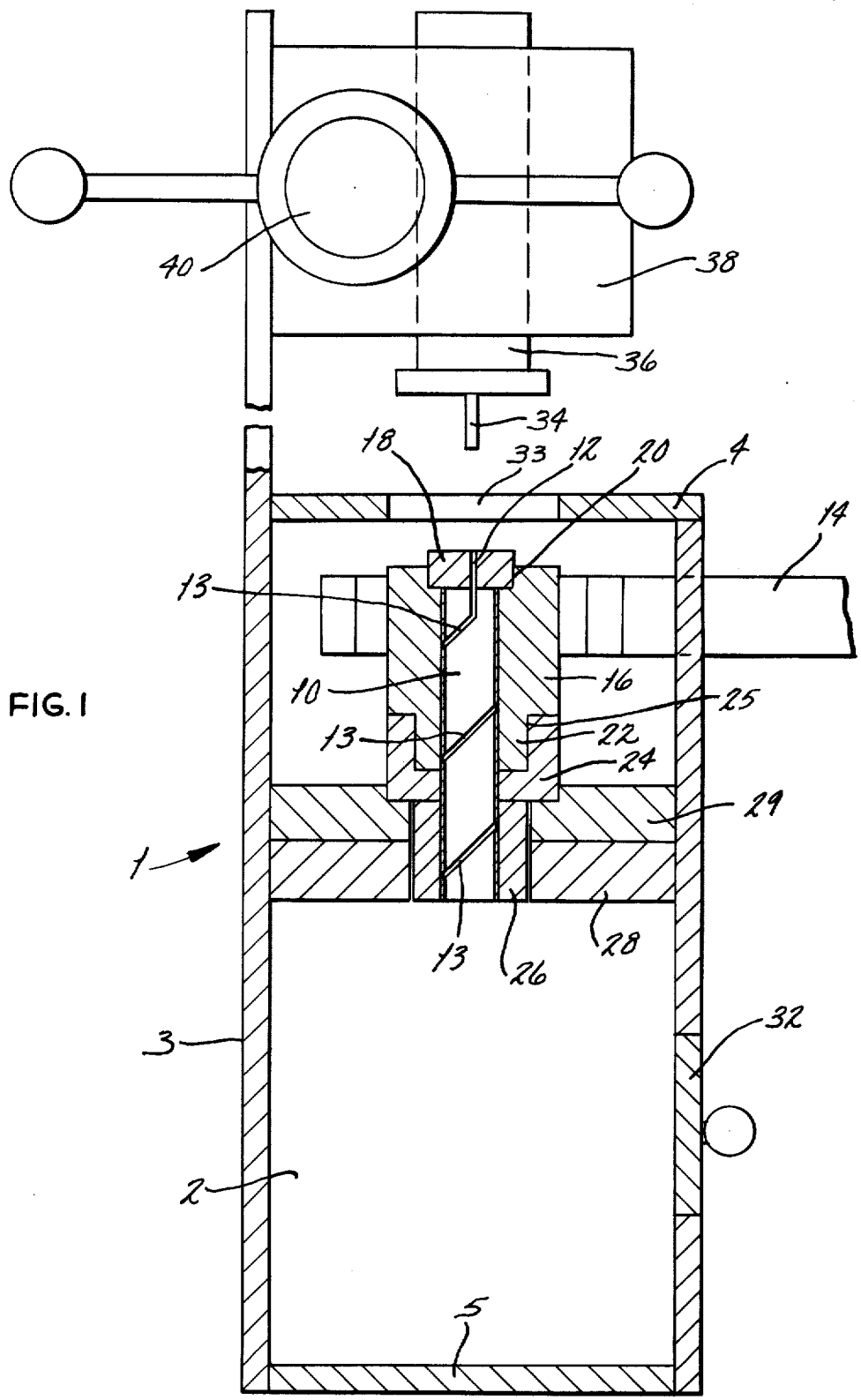
FIG. 1 is a side elevational view in partial cross-section of a machine for forming a helical cutting face constructed in accordance with and embodying the present invention.

In the drawing, 1 deignates a machine of the general type commonly used in manufacturing cutting tools, having a housing or enclosure 2 with up-standing side and end walls, as at 3, and a top and a bottom wall 4, 5, respectively. Mounted within housing 2 is a cylindrical core 10 formed from a relatively high conductive refractory material, such as graphite, and being provided with a straight feed slot 12 formed in the core surface; feed slot 12 having a continuation 13 in helical form around the remainder of the length of core 10. Core 10 is circumferentially closely surrounded by a liner 16, also preferably of graphite, provided at its upper end with a recess 20 for receiving the diametrally enlarged head 18 of core 10; said head 18 assuring that core 10 will not move relative to liner 16 through any forces applied during operation. Liner 16 is diametrally reduced as at 22, in its lower portion, forming a shoulder 23, which reduced portion 22 fits snugly within a recess 25 within a cylindrical coke insulator 24; the upper edge of said latter abutting tightly against shoulder 23. Insulator 24 is also axially bored for disposition about core 10.

Disposed below insulator 24 is a baked coke sleeve 26, which is packed in superimposed layer formations of asbestos-like material 28 and ceramic 29. Said latter layer formations extend to the walls of housing 2 and with packing 28 cooperating with bottom wall 5 and intervening portion of side and end walls 3 to define a cooling box 30, same thus being located below core 10 and communicating with the exterior through a door 32 formed in one end wall 3, through which door finished, shaped pieces may be withdrawn. Surroundingly of liner 16 in the general region of core head 18 is a high frequency, electrical induction coil heater 14 adapted to heat core 10 to a predetermined temperature with heat transmission through liner 16.

Top wall 4 is substantially centrally provided with an opening 33 for receiving a probe 34 of a quill 36 of an overhead mechanism 38 for feeding the starting pieces. Probe 34 and quill 36 are advanced by mechanism 38 through means of a manual rack and pinion unit designated 40. Thus, said unit 40 upon actuation will effect raising and lowering of quill 36 for entry into housing 2 through opening 33 and for withdrawal therefrom. Probe 34 is dimensioned for reception within feed slot 12. In operation a straight piece of metal, of predetermined length, as of sintered tungsten carbide, as of rectangular cross-section, is inserted within feed slot 12 as by a pair of pliers or other convenient hand tool. Heater 14 will then cause the carbide to be heated to deformation temperature, after which probe 34 is lowered through actuation of rack and pinion 40 for engaging the metal piece and thereby advancing the now deformed material through continuation 13 whereby the piece assumes the desired helical shape in conformity to continuation 13. Continued advance of the work causes same to be removed from the zone of heater 14 and due to the high conductivity of liner 16, the piece is quickly cooled below deformation temperature. The work piece then advances through baked coke insulator 24, sleeve 26 and into cooling box 30; retaining its helical form as imparted by continuation 13. Thus, on reaching cooling box 30 the now cutting face is sufficiently hard so that the same may be withdrawn through door 32. The same may then be shot blasted to remove any superficial oxidation which may have occurred during the forming process and is brazed onto the body (not shown) of an engineer's cutting tool. Grinding may then be used to effect final shaping.

The above described procedure is, of course, equally effective for the purpose of producing cutting faces of other than sintered tungsten carbide; such as ceramics and high speed steels.

Core 10 may also be constructed of a ceramic material and is produced by machining. Core 10 is generally the same shape as the tool to which the helical or spiral cutting face is to be secured.

Figure 2:
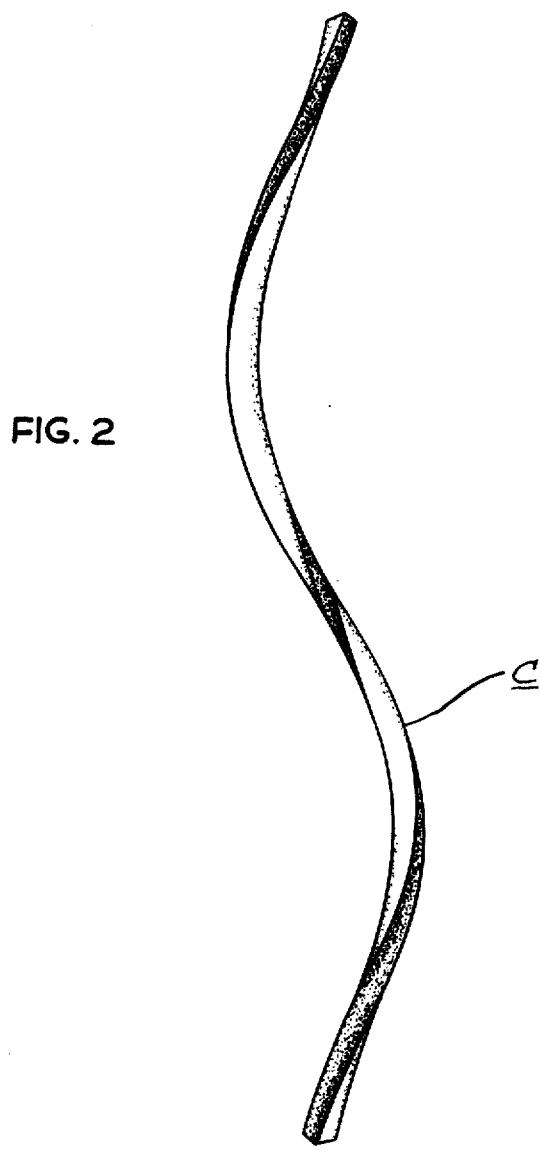
FIG. 2 is a perspective view of one form of a helical cutting face produced according to the present invention.
Figure 3:
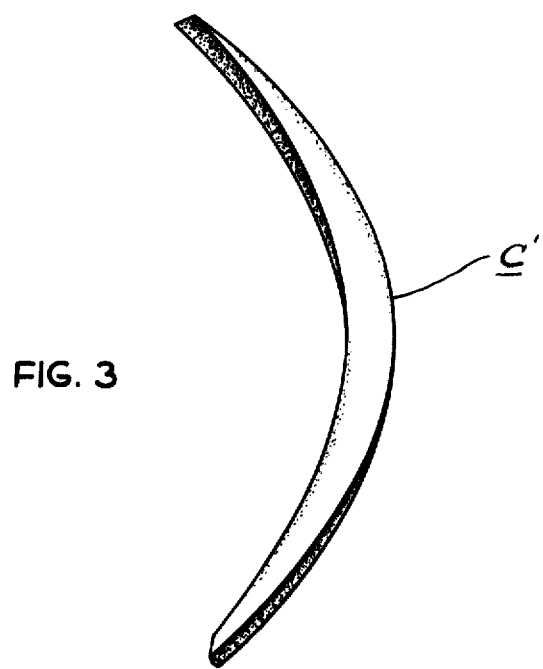
FIG. 3 is a perspective view of another form of a helical cutting face produced according to the present invention.

FIGS. 2 and 3 illustrate cutting faces indicated $c$, $c'$ respectively, which are of the type produced by the present method and demonstrate pieces having helix angles of a greater extent than heretofore obtained, as in the order of 10° and above, and with a length greater than one third of the total lead. As stated, however, said FIGURES are merely illustrative and also show cutting faces of different cross-section. The rate of advance of the work pieces through core 10 is most sensitively controlled by the operator since mere finger touch will permit of requisite pressure being exerted by quill 36 so that the advance may be at the desired rate. However, if desired, the feeding may be automated by the provision of a hopper for pieces to be treated and control of the feed pressure by electronic feed back or a slip clutch.

The present invention also contemplates a two-stage procedure for the purpose of imparting a relatively high helix or spiral angle to the work piece. Thus, in the first stage, a relatively small angle is formed through utilization of a core having an appropriate feed slot and continuation and then, after cooling the work piece is then subjected to a second forming operation wherein the second core is provided with a forming slot having the requisite angle. The cooling is carried out as quickly as possible so that the desired shape of the work piece is maintained.

It is also within the contemplation of this invention that a single core may be provided with two or more feed slots and continuations which are offset from each other in the surface of a core for the shaping of the helical cutting face.

Apparatus according to the present invention may be adapted to the shaping of pieces of different overall diameters for use on cores of corresponding faces by making sets of removable cores and liners.

Having thus described my invention, what I claim and desire to obtain by Letters Patent is:

1. Apparatus for shaping a helical face piece for an engineer's tool comprising a core, a feed slot in the surface of said core in the shape of a piece of hard cutting material to be shaped, means for heating hard cutting material in the feed slot up to a temperature at which the material is hot deformable, a continuation of the feed slot in the shape desired in the finished piece, the continuation being long enough to allow the piece to cool to a temperature at which the material is no longer deformable, and means for feeding a piece of material into the feed slot.

2. Apparatus as defined in claim 1 and further characterized by said core having at least two feed slots offset from each other in the surface of a cylindrical core for the shaping of a helical face piece.

3. Apparatus as defined in claim 2 and further characterized by the core being of graphite.

4. Apparatus as defined in claim 3 and further characterized by means for heating comprising an electrical induction coil surrounding an outer liner for the core.

5. Apparatus as defined in claim 4 and further characterized by the core being provided with an enlarged head portion adapted to fit in a recess in the outer liner.

6. Apparatus as defined in claim 5 and further characterized by the means for feeding comprising a quill.

* * * * *